United States Patent
Schmisseur et al.

(10) Patent No.: US 8,583,984 B2
(45) Date of Patent: Nov. 12, 2013

(54) METHOD AND APPARATUS FOR INCREASING DATA RELIABILITY FOR RAID OPERATIONS

(75) Inventors: Mark A. Schmisseur, Phoenix, AZ (US); Sivakumar Radhakrishnan, Portland, OR (US); Pankaj Kumar, Chandler, AZ (US); Marc A. Goldschmidt, Scottsdale, AZ (US); Peter Molnar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 12/976,247

(22) Filed: Dec. 22, 2010

(65) Prior Publication Data

US 2012/0166909 A1  Jun. 28, 2012

(51) Int. Cl.
*H03M 13/00* (2006.01)

(52) U.S. Cl.
USPC .......................................... 714/758; 714/770

(58) Field of Classification Search
USPC .................................. 714/758, 770
See application file for complete search history.

(56) References Cited

U.S. PATENT DOCUMENTS

| | | | |
|---|---|---|---|
| 5,640,506 A * | 6/1997 | Duffy | 714/6.12 |
| 7,376,863 B2 * | 5/2008 | Benhase et al. | 714/6.22 |
| 7,743,308 B2 * | 6/2010 | Subbarao | 714/770 |
| 8,046,629 B1 * | 10/2011 | Sutardja | 714/6.22 |
| 8,069,317 B2 * | 11/2011 | Boyd et al. | 711/156 |
| 2005/0289253 A1 * | 12/2005 | Edirisooriya et al. | 710/22 |
| 2009/0164691 A1 * | 6/2009 | Wang et al. | 710/309 |

OTHER PUBLICATIONS

"Working Draft Project American National Standard", T10/1799-D, Revision 19, May 29, 2009, 220 pages.
Penokie, "SBC-3: Adding a Protection Information Interval", T10 Committee (SCSI), T10/08-415 revision 0, Oct. 29, 2008, pp. 1-15.

\* cited by examiner

*Primary Examiner* — Philip Guyton
(74) *Attorney, Agent, or Firm* — Caroline M. Fleming (57) ABSTRACT

A method and apparatus to enable data integrity checking of a block of data while the block of data is being transferred from a volatile memory to a non-volatile storage device is provided. The data integrity checking is performed in conjunction with Direct Memory Access operations and Redundant Array of Independent Disk (RAID) operations. In addition, data integrity checking of syndrome blocks in the RAID is performed during transfers to/from the storage devices in the RAID system and during RAID update and RAID data reconstruction operations.

12 Claims, 11 Drawing Sheets

| DESCRIPTOR CONTROL 402 | TRANSFER SIZE 404 |
|---|---|
| SOURCE ADDRESS 406 ||
| DESTINATION ADDRESS 408 ||
| NEXT DESCRIPTOR ADDRESS 410 ||
| RESERVED 412 ||
| RESERVED 414 ||

| SOURCE APP TAG 415 | SOURCE APP MASK 416 | SOURCE REF TAG 417 |
|---|---|---|

| RESERVED 418 |
|---|

| DESCRIPTOR CONTROL 502 | TRANSFER SIZE 504 |
|---|---|
| SOURCE ADDRESS 506 ||
| DESTINATION ADDRESS 508 ||
| NEXT DESCRIPTOR ADDRESS 510 ||
| RESERVED 512 ||
| RESERVED 514 ||

| SOURCE APP TAG 515 | SOURCE APP MASK 516 | SOURCE REF TAG SEED 517 |
|---|---|---|
| DEST APP TAG 518 | DEST APP MASK 519 | DEST REF TAG SEED 520 |

FIG. 5

| | | |
|---|---|---|
| DESCRIPTOR CONTROL 602 | colspan="2" | TRANSFER SIZE 604 |
| | SOURCE ADDRESS 606 |
| | DESTINATION ADDRESS 608 |
| | NEXT DESCRIPTOR ADDRESS 610 |
| | RESERVED 612 |
| | DIX SOURCE BUFFER ADDRESS 614 |
| SOURCE APP TAG 615 | SOURCE APP MASK 616 | SOURCE REF TAG SEED 617 |
| DEST APP TAG 618 | DEST APP MASK 619 | DEST REF TAG SEED 620 |

METHOD AND APPARATUS FOR INCREASING DATA RELIABILITY FOR RAID OPERATIONS

FIELD

This disclosure relates to managing a Random Array of Independent Disks (RAID) and in particular to increasing data reliability of RAID operations.

BACKGROUND

A Redundant Array of Independent Disks (RAID) combines a plurality of physical hard disk drives into a logical drive for purposes of reliability, capacity, or performance. Thus, instead of multiple physical hard disk drives, an operating system sees the single logical drive. As is well known to those skilled in the art, there are many standard methods referred to as RAID levels for distributing data across the physical hard disk drives in a RAID system.

For example, in a level 0 RAID system the data is striped across a physical array of hard disk drives by breaking the data into blocks and writing each block to a separate hard disk drive. Input/Output (I/O) performance is improved by spreading the load across many hard disk drives. Although a level 0 RAID improves I/O performance, it does not provide redundancy because if one hard disk drive fails, data is lost A level 5 RAID system provides a high level of redundancy by striping both data and parity information across at least three disk drives. Data striping is combined with parity to provide a recovery path in case of failure. A level 6 RAID system provides an even higher level of redundancy than a level 5 RAID system by enabling recovery from double disk failures.

In a level 6 RAID system, two syndromes referred to as the P syndrome and the Q syndrome are generated for the data and stored on disk drives in the RAID system. The P syndrome is generated by simply computing parity information for the data (data blocks (strips)) in a stripe (data blocks (strips), P syndrome block and Q syndrome block). The generation of the Q syndrome requires Galois Field (GF) multiplications and is a more complex computation. The regeneration scheme to recover data and/or P syndrome block and/or Q syndrome block performed during disk recovery operations requires both GF and inverse operations.

The generation and recovery of the P and Q syndrome blocks for RAID 6 and parity for RAID 5 requires the movement of large blocks of data between system memory and a storage device (I/O device). Typically, an Input Output (I/O) Controller (IOC) in a computer system includes a Direct Memory Access (DMA) controller (engine) to perform transfers of data between memory and the I/O device. The computer system can also include a DMA controller used for memory to memory data transfers. A DMA controller allows a computer system to access memory independently of the processor (core). The processor initiates a transfer of data from a source (memory or I/O device (controller)) to a destination (memory or I/O device (controller)) by issuing a data transfer request to the DMA controller. The DMA controller performs the transfer while the processor performs other tasks. The DMA controller notifies the processor, for example, through an interrupt when the transfer is complete. Typically, a DMA controller manages a plurality of independent DMA channels, each of which can concurrently perform one or more data transfers between a source and a destination.

Typically, a data transfer from a source to a destination is specified through the use of a descriptor, that is, a data structure stored in memory that stores variables that define the DMA data transfer. For example, the variables can include a source address (where the data to be transferred is stored in the source (memory (or I/O device)); size (how much data to transfer) and a destination address (where the transferred data is to be stored in the destination (memory (or I/O device)). The use of descriptors instead of having the processor write the variables directly to registers in the DMA controller prior to each DMA data transfer operation allows chaining of multiple DMA requests using a chain of descriptors. The chain of descriptors allows the DMA controller to automatically set up and start another DMA data transfer defined by a next descriptor in the chain of descriptors after the current DMA data transfer is complete.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As user data is being transferred within a computer system between a source and destination in the computer system, the user data may be corrupted. For example, as data stored in a volatile memory (source) is transferred to a non-volatile storage device such as a hard disk drive (HDD) or a solid state device (SSD), data corruption can occur in an internal data path or intermediate volatile memory such as a First In First Out (FIFO) or cache memory.

The user data may be corrupted due to a soft error. A soft error involves a change to data and may be caused by random noise or signal integrity problems. Soft errors may occur in transmission lines, in logic, in magnetic storage or in semiconductor storage. These errors may be due to cosmic events in which alpha particles result in random memory bits changing state from a logical '0' to a logical '1' or from a logical '1' to a logical '0'.

A soft error does not damage hardware; the only damage is to the data that is being processed. In many cases the soft error is not detected prior to storing on the non-volatile storage device. As such, silent data corruption can happen, resulting in incorrect data being written to storage devices. When silent data corruption occurs in a fault tolerant Redundant Array of Independent Disks (RAID) configuration, the value of RAID is negated, as the RAID contains corrupt data.

The standard Small Computer Systems Interface (SCSI) protocol defines a protection information model which provides for protection of a block of data while it is being transferred between a sender and receiver. Protection information generated at an application layer may be checked while it is being transferred and is retained, that is, written to the non-volatile storage device. The protection information is referred to as a data integrity field (DIF).

A DIF is appended to a logical block of data and includes a cyclic redundancy check (CRC) stored in a logical block guard, a logical block application tag and a logical block reference tag. The contents of the block of data immediately preceding the logical block guard is used to generate and check the CRC stored in the logical block guard field. In the protection information model defined by the SCSI protocol, the block of data is a 512 byte block and the DIF field is 8 bytes. The 8-byte DIF includes a 16-bit block guard, a 16-bit application tag and a 32-bit reference tag. The application tag is opaque storage information and the reference tag protects against out-of-order and misdirected write scenarios. The 8-bytes of DIF information allow all nodes in an Input/Output path, including the storage device, to verify the integrity of the block of data.

The verification of the integrity of the block of data at each node in the Input/Output (I/O) path is slow and consumes many Central Processing Unit (CPU) cycles. In an embodiment of the present invention, a method and apparatus to increase the efficiency of verification the integrity of a block of data in an I/O path in a computer system is provided.

In an embodiment, a DMA controller performs DIF checking in conjunction with a DMA operation to move data from a source to a destination. Combining RAID operations with DIF checking offloads CPU cycles to provide support for data integrity (via a DIF) from the processor and reduces the CPU cycles needed to support DIF checking.

Figure 1:
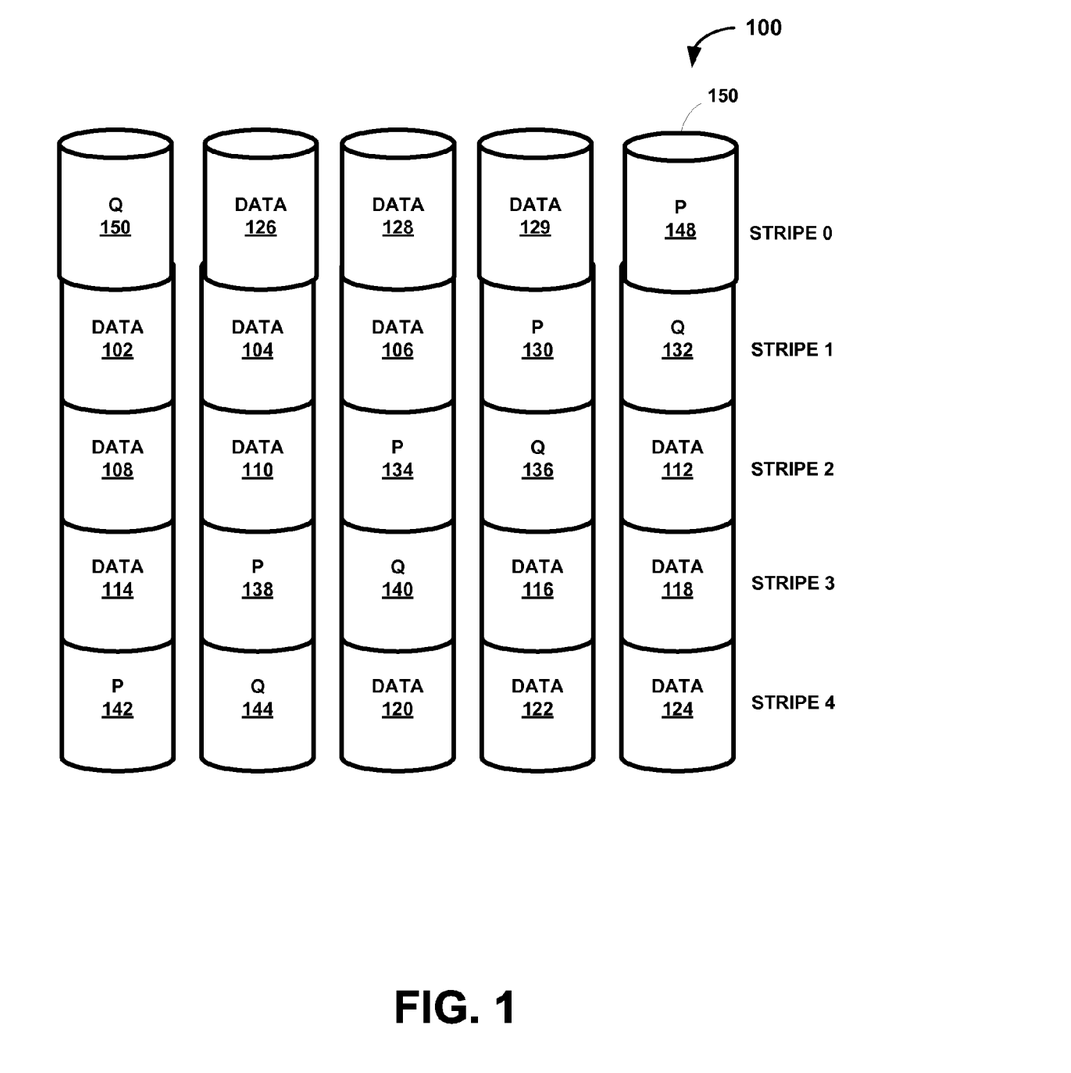
FIG. 1 is a block diagram illustrating an embodiment of a RAID-6 array showing a plurality of stripes with each stripe including data blocks (strips) and P and Q syndromes striped across an array of hard disks.

FIG. 1 is a block diagram illustrating an embodiment of a RAID-6 array 100 showing a plurality of stripes with each stripe including data blocks (strips) and P and Q syndromes striped across an array of hard disk drives (storage devices) 150. In the embodiment shown, the RAID array has five hard disks 150. Each stripe includes three data blocks and two syndrome (P, Q) blocks with each of the five blocks stored on a different one of the five hard disks 150. Data is written to the RAID-6 array 100 using block-level striping with P and Q syndromes distributed across the member hard disks in a round robin fashion. Sequential data, for example, a file segmented into blocks may be distributed across a stripe, for example, horizontal stripe 0, with one of the blocks stored in data blocks 102, 104, 106 on three of the data disks 150. A P syndrome and a Q syndrome computed for the data blocks 102, 104, 106 in horizontal stripe 0 are stored in a respective P block 130 and Q block 132. As shown, the P syndrome blocks and Q syndrome blocks are stored on different hard disks 150 in each stripe. In one embodiment, there are 512 bytes in each block in a stripe.

The P syndrome may be generated by performing an Exclusive OR (XOR) operation. XOR is a logical operation on two operands that results in a logical value of '1', if only one of the operands has a logical value of '1'. For example, the XOR of a first operand having a value '11001010' and a second operand having a value '10000011' provides a result having a value '01001001'. If the hard disk drive that stores the first operand fails, the first operand may be recovered by performing an XOR operation on the second operand and the result.

The P syndrome is the simple parity of data (D) computed across a stripe using ⊕ (XOR) operations. In a system with n data disks, the generation of the P syndrome is represented by equation 1 below:

$$P = D_0 \oplus D_1 | D_2 \ldots | D_{n-1} \quad \text{(Equation 1)}$$

The computation of the Q syndrome requires multiplication (*) using a Galois Field polynomial (g). Arithmetic operations are performed on 8-bit (byte) Galois Field polynomials at very high performance. A polynomial is an expression in which a finite number of constants and variables are combined using only addition, subtraction, multiplication and non-negative whole number exponents. One primitive polynomial is $x^8+x^4+x^3+x^2+1$ which may be denoted in hexadecimal notation by 1D. The Galois Field (GF) operations on polynomials are also referred to as GF(2^8) arithmetic. In a system with n data disks, the generation of the Q syndrome is represented by equation 2 below:

$$Q = g^0 * D_0 \oplus g^1 * D_1 \oplus g^2 * D_2 \ldots \oplus g^{n-1} * D_{n-1} \quad \text{(Equation 2)}$$

Byte-wise Galois-field operations are performed on a stripe basis, where each byte in the block is computationally independent from the other bytes. Byte-wise Galois-Field operations can accommodate as many as 255 (2^8−1) data disks.

Figure 2:
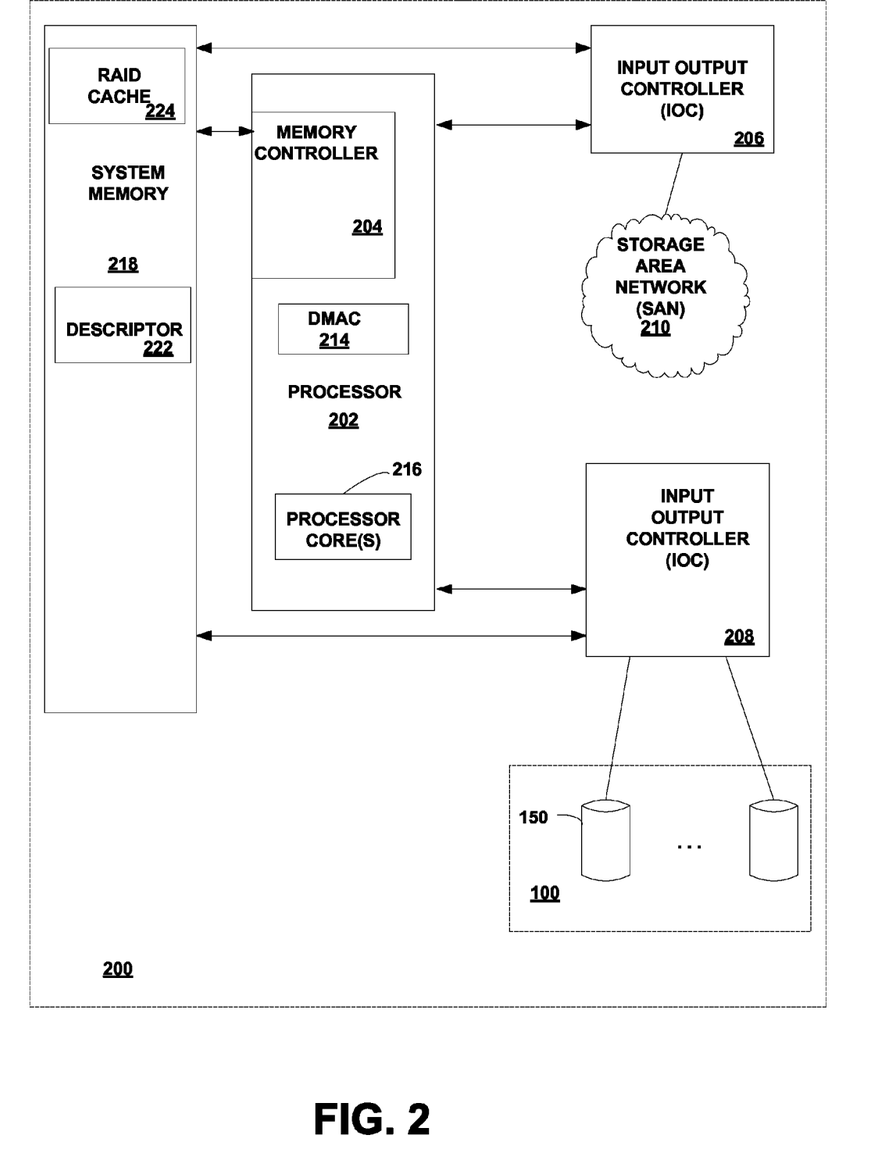
FIG. 2 is a block diagram of an embodiment of a system that includes a Direct Memory Access (DMA) controller to support both RAID operations and non-RAID operations.

FIG. 2 is a block diagram of an embodiment of a system 200 that includes a direct memory access controller (DMAC) 214 to support both RAID (for example, RAID 1, RAID 5 or RAID 6) operations and non-RAID operations.

The system 200 includes a processor 202, system memory 218 and Input Output Controllers (IOCs) 206, 208. The processor 202 includes a memory controller 204, one or more processor cores 216 and the DMA controller (DMAC) 214. In an embodiment the processor 202 is a system-on-a-chip (SOC). The first Input/Output Controller (IOC) 206 coupled to the processor 202 provides access to storage devices (not shown) accessible via a Storage Area Network (SAN) 210. A second IOC 208 provides access to storage devices 150 directly coupled to the second IOC 208 that may be configured as a Random Array of Independent Disks (RAID) system. For example, in an embodiment, the storage devices 150 are configured as a RAID 6 system 100 as described in conjunction with FIG. 1.

The DMA controller 214 includes a plurality of DMA channels. The operation of each DMA channel is independent from the other DMA channels, which allows for different operations to be processed concurrently by each respective DMA channel.

The operations of a DMA channel include memory-to-memory data transfers and memory-to-memory mapped I/O (MMIO) data transfers. Each DMA channel moves data on command of its controlling process (a DMA client). A descriptor 222 describes each data transfer and enables the DMA controller 214 to perform the data transfers. The descriptor 222 is a data structure stored in memory 218 that stores variables that define the DMA data transfer. Upon completion of the data transfer, the DMA controller 214 can notify the processor core 216 of the completion via either an interrupt to the processor core 216, a memory write to a programmed location, or both. Each DMA channel in the DMA controller 214 provides optimal block data movement by supporting a scatter/gather operation specified by a linked list (chain) of descriptors 222. The DMA controller 214 executes the scatter/gather list of data transfers. At the completion of each operation, the DMA controller 214 can update the respective DMA channel's status register.

The DMA controller 214 provides support for RAID operations. A non-RAID operation that includes a Direct Memory Access (DMA) transfer used to transfer data blocks directly between the IOCs 206, 208 and system memory 218 is performed by a DMA channel in a DMA Controller in the respective IOC 206, 208. A The DMA controller 214 also provides support for RAID operations as defined by a RAID descriptor. A RAID operation includes at least one logical operation that is performed on a plurality of data blocks stored in system memory 218. The logical operation can be one of the logical operations described earlier for computing P and Q syndromes for a RAID 6 system 100 in conjunction with Equation 1 and Equation 2. One non-RAID operation is performed to fetch the data blocks from N different sources which can be aligned differently with respect to each other. Another non-RAID operation is performed to store the P and Q results back to system memory 218.

Both RAID and non-RAID operations are defined by one or more descriptors 222. In an embodiment, to initiate a RAID or non-RAID operation, a chain (linked list) of descriptors can be generated and stored in system memory 218. The address of the first descriptor 222 in the chain is provided to the DMA controller 214. In an embodiment, the address of the first descriptor 222 in the chain is written to a descriptor chain address register in the DMA controller 214. The RAID or non-RAID operation is initiated for a DMA channel in the DMA controller 214, for example, via a write to a DMA channel command register in the DMA controller 214.

Figure 3:
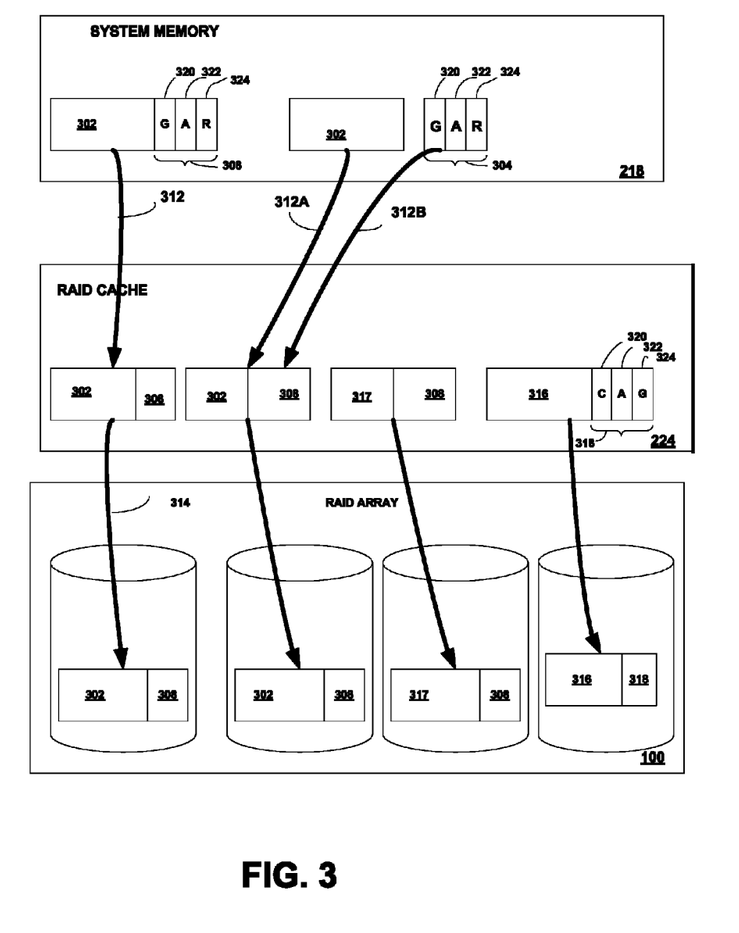
FIG. 3 is a block diagram of an embodiment of a source to destination path in the system shown in FIG. 2.

FIG. 3 is a block diagram of an embodiment of a source to destination path in the system shown in FIG. 2. The source is system memory 218 (FIG. 2) and the final destination is the RAID array 100 (FIG. 1) which includes a plurality of non-volatile storage devices. Data integrity of blocks of data to be written to the RAID array is checked three times in the path from the source (system memory 218) to the destination (RAID array) 100. First, data integrity is checked as the data is transferred via a DMA (non-RAID) operation from system memory 218 to RAID cache 224. Second, the data integrity is checked in RAID cache 224 during a RAID operation to compute syndrome blocks for a RAID stripe. Third, data integrity is checked as the RAID data and the syndrome blocks are transferred via a DMA (a non-RAID) operation by the IOC 208 from RAID cache 224 to the RAID array 100.

Referring to FIG. 3, in the embodiment shown, system memory 218 stores a block of data 302 together with a DIF 308 or a Data Integrity Extension (DIX) 304. The DIF 308 and DIX 304 each have 8 bytes that include three fields: a guard tag field ('G') 320, an application tag field ('A') 322 and a reference tag field ('R') 324.

A Cyclic Redundancy Check (CRC) checksum is stored in the guard tag field 320 of a DIF 308. A Data Integrity Extension (DIX) format can be used to store integrity information for a block of data 302 instead of a DIF 304. The DIX format is an extension to the DIF and uses an Internet Protocol (IP) checksum for the guard tag that is stored in the guard tag field 320 instead of a CRC checksum. In addition, the 8-bytes to store the guard tag in the guard tag field 320, application tag in the application tag field 322 and reference tag in the reference tag field 324 are stored in a separate memory location from the 512-byte block of data 302 which simplifies data alignment in the memory.

In an embodiment a DIF 308 or DIX 304 is generated for a block of data 302 on a host and stored in system memory in the host with the block of data 302 prior to being transferred to the RAID cache. In another embodiment, only the block of data 302 is stored in system memory in the host and a DIF 308 is generated for the data block 302 as the user data is transferred via a DMA operation from the system memory to the RAID cache. The generated DIF 308 is appended to the block of data 302 and stored in the RAID cache.

A DMA operation is used to transfer the block of data 302 to RAID cache with a type of DMA operation performed dependent on whether the block of data 302 stored in the system memory has an integrity block (DIF (308) or DIX (304)) or not.

As the DMA operation is copying the user data from the system memory to the RAID cache, the data integrity block (DIF or DIX) is verified (if provided) and an "update", "convert" or "generate" DIF operation is performed concurrently with the DMA transfer of the block of data 302.

If the source block of data 302 stored in system memory does not include an integrity block (DIF 308 or DIX 304), the DMA operation to move the source block of data 302 to the RAID cache is referred to as a DMA with DIF generation. As the DMA operation is performed to move the block of data 302 from system memory to RAID cache, a DIF generation is also performed to generate an 8-byte DIF 308, that is, appended to the block of data 302 and stored in the RAID cache. An embodiment of a descriptor that can be used to define the DMA with DIF generation "generate" operation will be described later in conjunction with FIG. 4.

If the source block of data 302 stored in system memory includes a DIF 308, the DMA operation to move the source block of data 302 to the RAID cache is referred to as a DMA with DIF update operation. An embodiment of a descriptor 222 that can be used to define a DMA operation to move a block of data 302 associated with a DIF "update" operation will be described later in conjunction with FIG. 5.

If the source block of data 302 stored in system memory includes a DIX 304, the DMA operation to move the source block of data to the RAID cache is referred to as a DMA with DIX convert operation. An embodiment of a descriptor 222 that can be used to define a DMA operation to move a block of data 302 associated with a DIX "convert" operation will be described later in conjunction with FIG. 6.

Figure 7A:
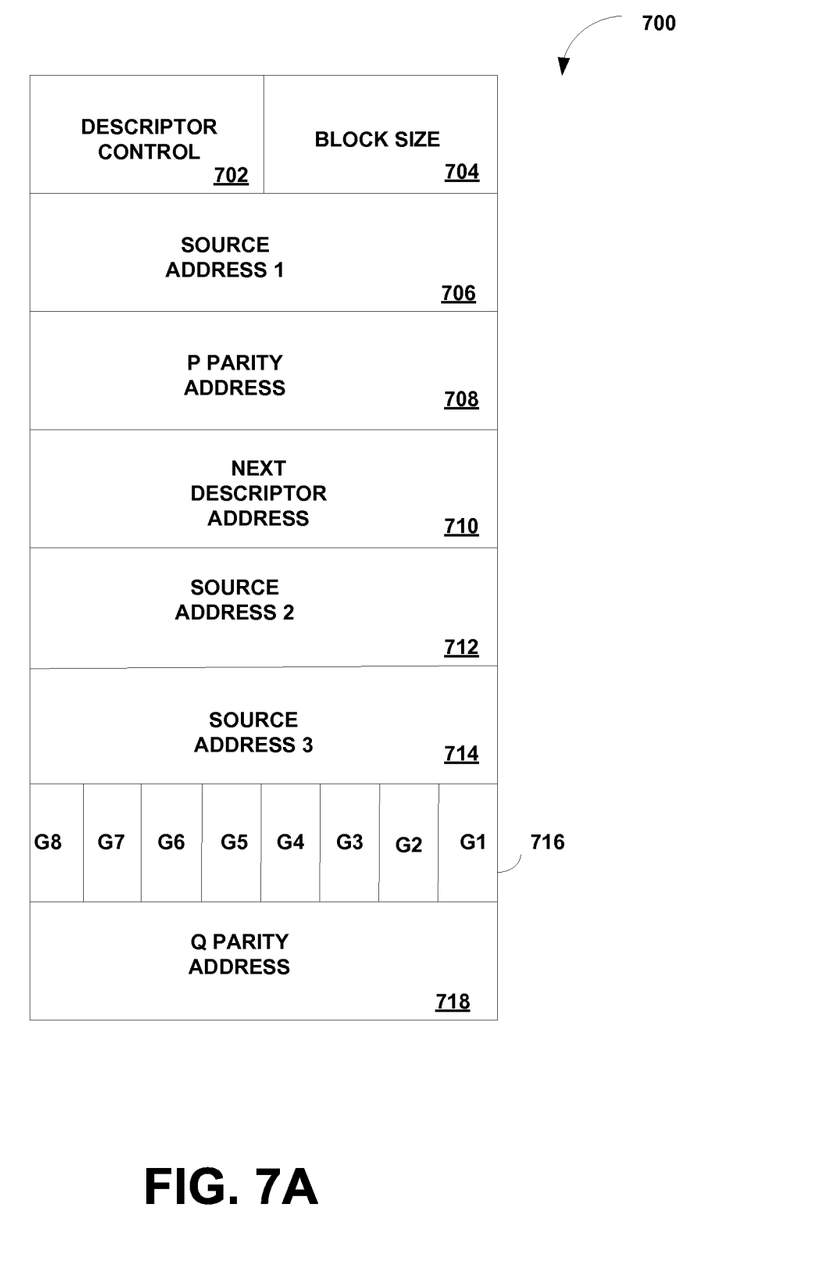
FIGS. 7A-7C is a block diagram of a RAID P Q Generate with DIF descriptor.

After the block of data 302 has been stored in RAID cache 224, a RAID with DIF operation is performed to create parity blocks for the plurality of blocks of data 302. In the case of a RAID 6, P and Q syndrome blocks are generated for a plurality of blocks of data as discussed in conjunction with FIG. 1. An embodiment of a descriptor that can be used to perform the RAID with DIF operation will be described later in conjunction with FIG. 7. The RAID with DIF operation reads the blocks of data 302 stored in RAID cache 224 with appended DIF 308, verifies and generates P and Q syndrome blocks, each having an appended DIF and writes the result of the operation in the RAID cache 224.

Finally, DMA operation 314 is performed to check the data sources and P and Q syndrome blocks along with their corresponding DIF and move (copy) them to the RAID array 100. The DMA operation performs a read of the block of data 302 and P and Q syndromes 316 stored in the RAID cache 2224, verifies the DIF 308, 318 and stores the data sources, P and Q syndrome blocks and DIFs 308, 318 in the RAID 100.

However, due to the nature of the GF2 modulo operation used to generate the Q syndrome block and the T10 polynomial used to generate the DIFs for the P and Q syndrome blocks, the generated Q syndrome block cannot be verified against its respective DIF. However, any corruption in the syndrome block is detected during the recovery process. RAID with DIF operations recover the lost data in the degraded volume by using the syndromes from one or more disks. The recovered data is checked against its recovered DIF before sending it to the host.

In an embodiment of the present invention data integrity checking of the P and Q syndrome blocks to/from the storage device is enabled by modifying the syndrome DIF. A modified DIF 318 appended to the Q syndrome block 316 allows data integrity checking of the Q syndrome block 316 prior to storing in the RAID array. The DIF 308 that is appended to a block of data 302 and the P syndrome block 317 includes a cyclic redundancy check (CRC) stored in the block guard field 320, a block application tag stored in application tag field 322 and a logical block reference tag stored in the reference tag field 324.

The modified DIF 318 that is appended to the Q syndrome block 316 is modified to allow verification of the RAID source parity DIF. A new guard CRC of the Q syndrome block is generated and stored in the block guard field 320 of the modified DIF 318. The original CRC stored in the block guard field 320 is stored in the reference tag field 324. The original CRC is stored to allow reconstruction of the missing data block DIF in the event of a failure in a block of data stored in the RAID. The reference tag of the reconstructed block of data is generated directly. Thus, it is not necessary to preserve the value stored in the DIF 308. The other values stored in the modified DIF 318, that is the original block guard and application tag are used in the reconstruction. The modified DIF 318 for the Q syndrome block 316 allows RAID source DIF verification of Q syndrome blocks in the path from source to destination.

The RAID with DIF function performs two functions such as RAID and T10 DIF Checking and Q Syndrome modified DIF generation with a single memory read operation which increases reliability and performance.

Figure 4:
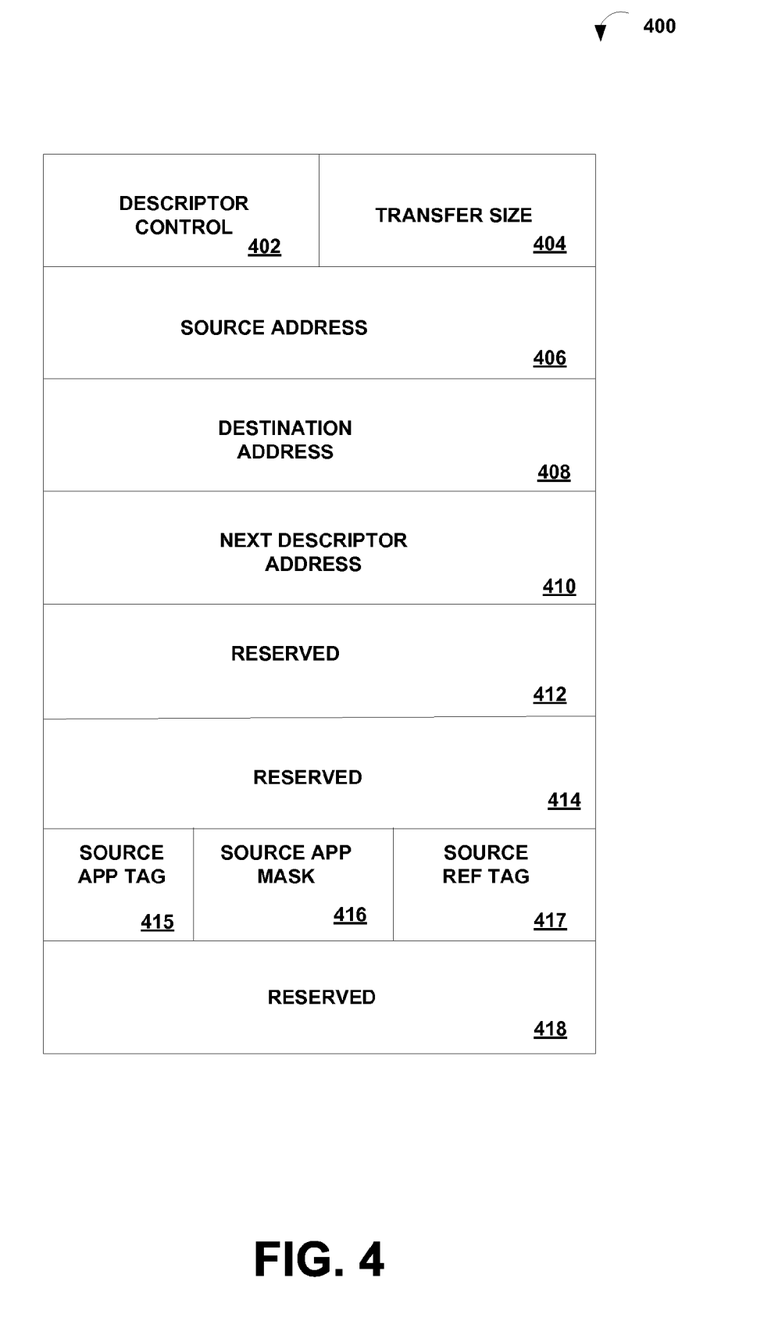
FIG. 4 is a block diagram of a DMA with Data Integrity Field (DIF) descriptor.

FIG. 4 is a block diagram of a DMA with DIF descriptor 400. In the DIF insert mode, the DMA controller 214 calculates a guard tag to be stored in the guard tag field 322 in the DIF block on a given block data 302. In an embodiment, the guard tag is a 16-bit Cyclic Redundancy Check (CRC) of a CRC operation performed on the block of data 302. The DMA controller 214 also inserts an application tag value in the application tag field 324 and a reference tag value in the reference tag field 326 of the DIF 308 based on the contents of a source DIF application tag field 415, a source application mask field 416 and a source reference tag seed field 417 in the DMA with DIF descriptor 400. The DIF 308 is appended at the end of the block of data 302 and written to RAID cache.

Referring to FIG. 4, the DMA with DIF descriptor 400 includes a descriptor control field 402, a transfer size field 404 (to store the size of the data block to be transferred), a source address field 406 (to store source address for data blocks stored in system memory 218), the source DIF application tag field 415, the source application mask field 416, the source reference tag seed field 417 and reserved fields 410, 412, 414 and 418. The DMA with DIF Descriptor 400 also includes a next descriptor address 410 to store an address of the next descriptor in a chain of descriptors to be processed by the DMA controller 214 and a destination address field 408 to store the address in RAID cache at which the block of data 302 and the DIF 308 are to be stored.

Figure 5:
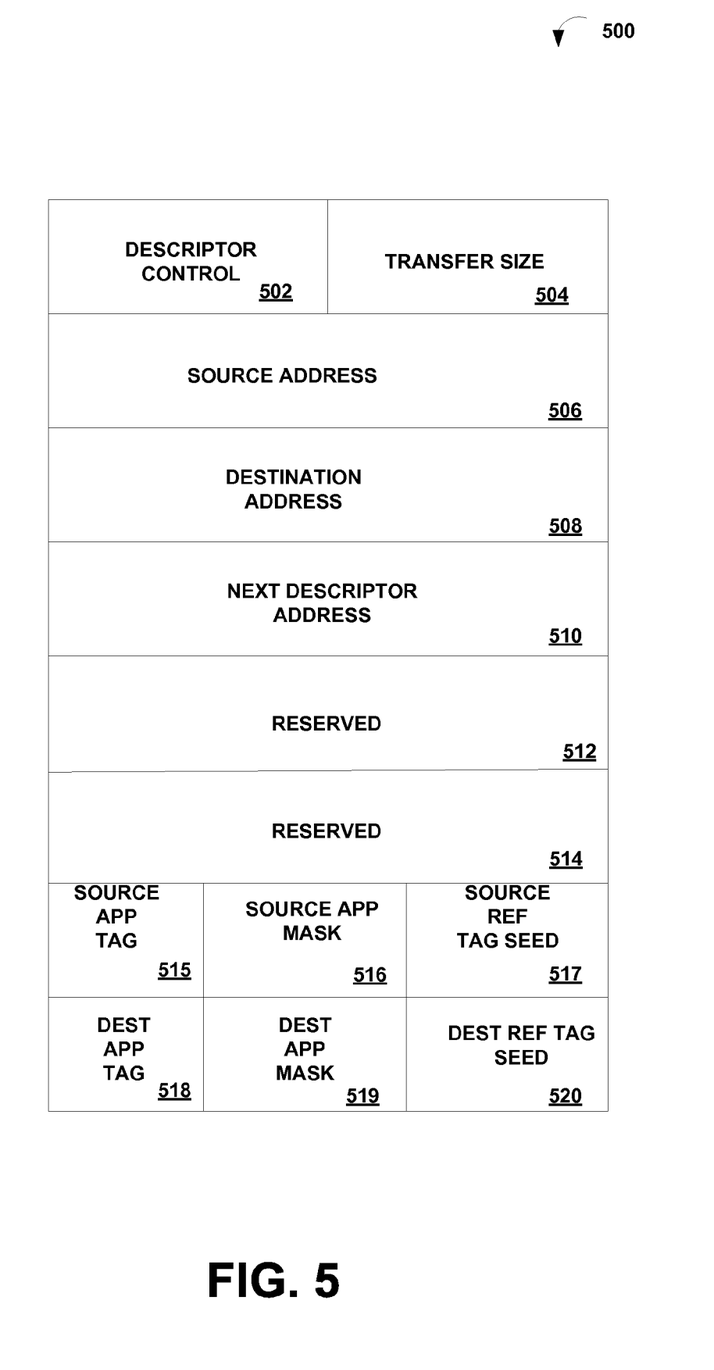
FIG. 5 is a block diagram of a DMA with DIF update descriptor.

FIG. 5 is a block diagram of a DMA with DIF update descriptor 500. The DMA with DIF update operation performs a DIF to DIF conversion between a source and destination with both source and destination including a block of data 302 and associated DIF 304.

Referring to FIG. 5, the DMA with DIF update descriptor 500 includes a descriptor control field 502, a transfer size field 504 (to store the size of the data block to be transferred), a source address field 506 (to store source address for data blocks stored in system memory 218) and reserved fields 510, 512, 514, and 516. The DMA with DIF update descriptor also includes a source DIF application tag field 515, a source application mask field 516, a source reference tag seed field 517, a destination DIF application tag field 518, a destination application mask field 519, and a destination reference tag seed field 518. In addition, the DMA with DIF update descriptor 500 also includes a next descriptor address 510 to store an address of the next descriptor in a chain of descriptors to be processed by the DMA controller 214 and a destination address field 508 to store the address in RAID cache at which the block of data 302 and the DIF 308 are to be stored.

The verification of the source block of data and source DIF verification is performed based on the state of the source DIF application tag field 515, the source application mask field 516 and the source reference tag seed field 517, in the DMA with DIF update descriptor 500. Also, the destination DIF generation is performed based on the state of the destination DIF application tag field 518, the destination application mask field 519, and the destination reference tag seed field 518 in the DMA with DIF update descriptor 500. For the update operation, the size of the destination block of data is same as the size of the source block size and the size of the source DIF and destination DIF is also the same. The T10 algorithm is used to generate the CRC stored in the block guard field 322 in the DIF 308 for both source and destination.

Figure 6:
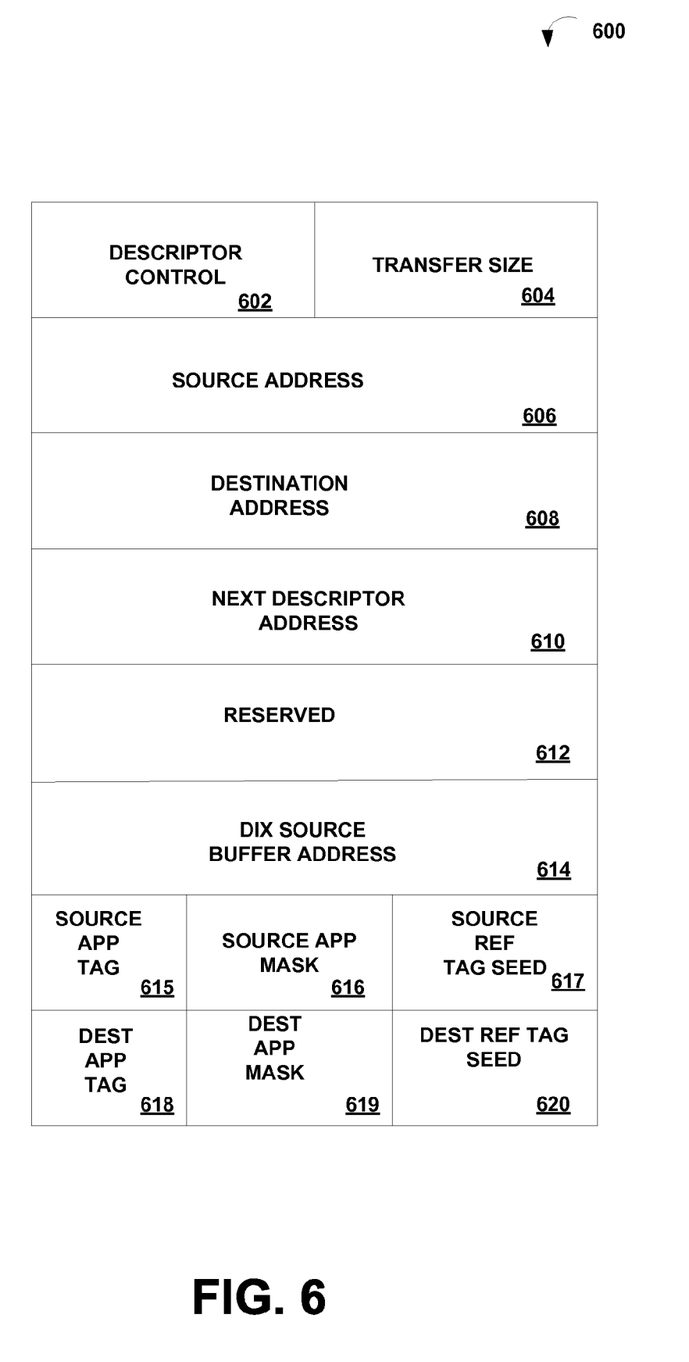
FIG. 6 is a block diagram of a DMA Operation with Data Integrity Extension (DIX) to DIF Convert descriptor.

FIG. 6 is a block diagram of a DMA Operation with DIX to DIF Convert Descriptor 600. The DMA operation defined by this descriptor 600 transforms a data integrity block in DIX format to a data integrity block in DIF format.

Referring to FIG. 6, the DMA with DIX to DIF convert descriptor 600 includes a descriptor control field 602, a transfer size field 604 (to store the size of the data block to be transferred), a source address field 606 (to store source address for data blocks stored in system memory 218) and reserved field 612 The DMA with DIX to DIF convert descriptor also includes a source DIF application tag field 615, a source application mask field 616, a source reference tag seed field 617, a destination DIF application tag field 618, a destination application mask field 619, and a destination reference tag seed field 618. In addition, the DMA with DIF update descriptor 600 also includes a next descriptor address 610 to store an address of the next descriptor in a chain of descriptors to be processed by the DMA controller 214, a destination address field 608 to store the address in RAID cache at which the block of data 302 and a DIX source buffer address field 614 to store the start address of a source DIX buffer.

The DMA operation converts two separate buffers identified by the source address stored in the source address field 606 and the DIX source buffer address stored in the DIX source buffer address field 414 to a single interleaved destination buffer identified by the destination address stored in the destination address field 608. After the DMA operation, the destination buffer stores the source data and appended DIF. In addition, the DMA with DIX to Convert operation transforms the DIX (T10 source) to a DIF (T10 destination) format.

Figure 7B:
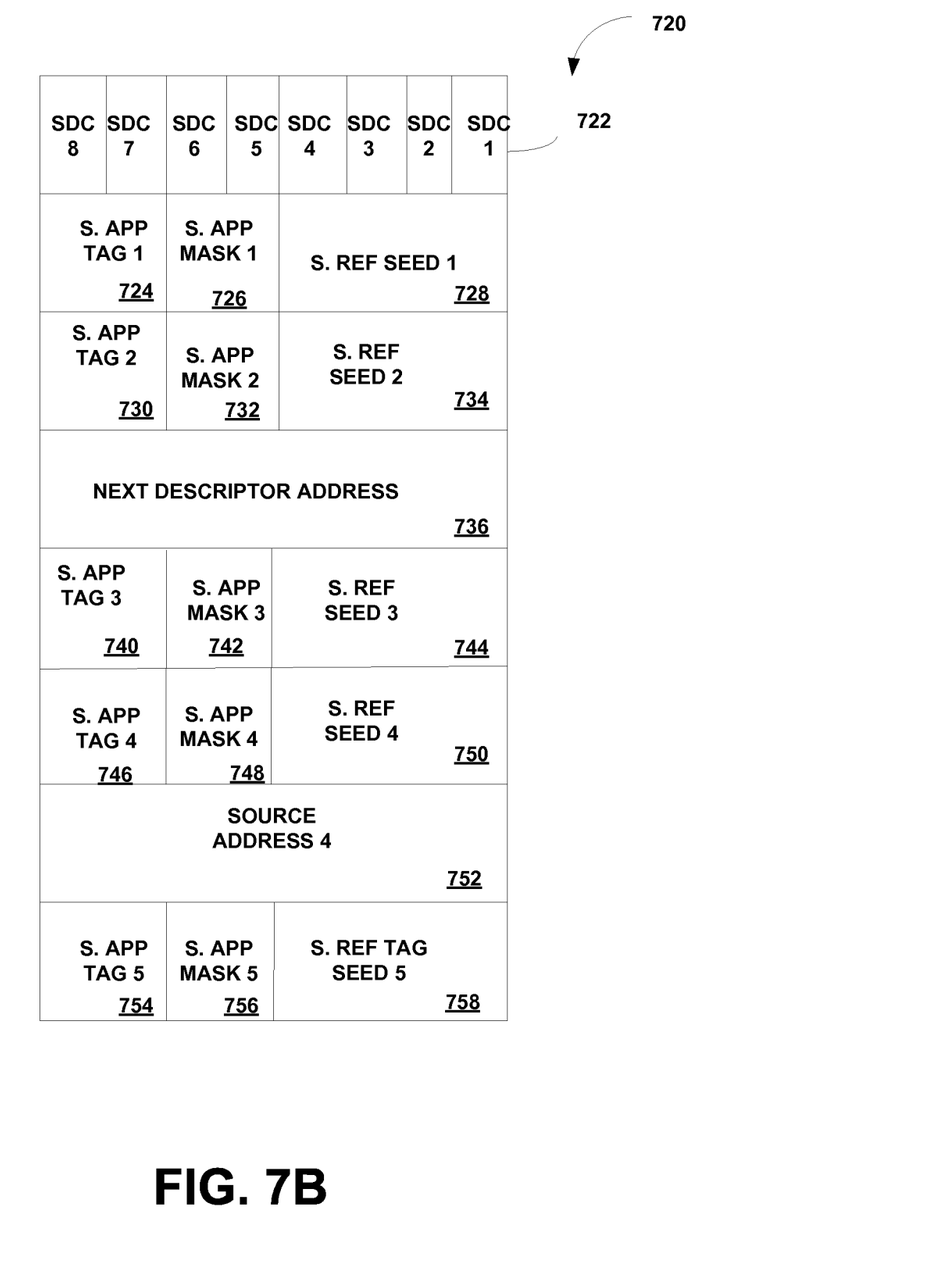
Figure 7C:
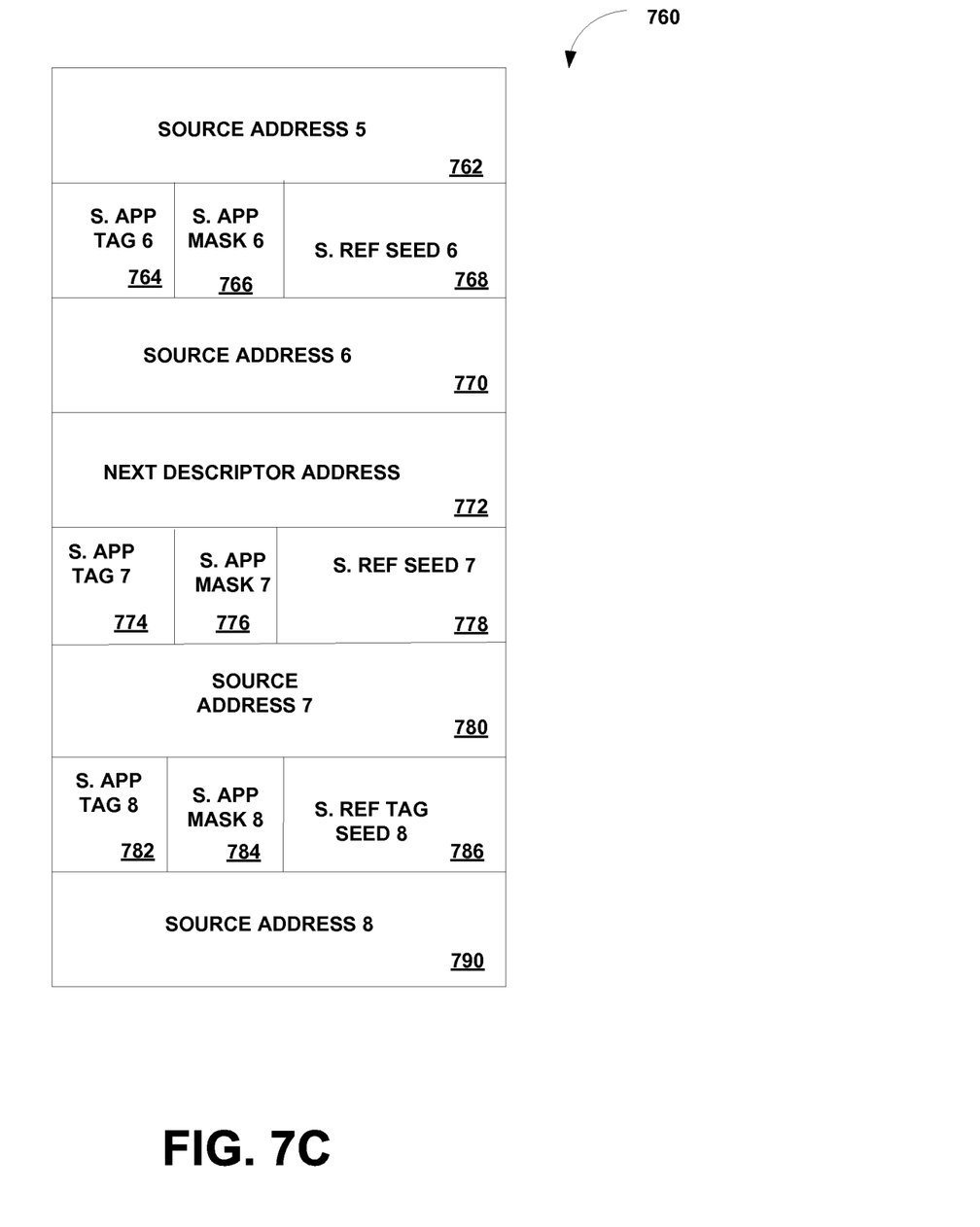

FIGS. 7A-7C is a block diagram of RAID P Q Generate with DIF descriptor. The RAID P Q Generate with DIF Descriptor includes a base descriptor 700 (FIG. 7A) and at least one extended descriptor dependent on the number of sources. In the embodiment shown in FIGS. 7A-7C, there are two extended descriptors 720 (FIG. 7B), 760 (FIG. 7C). The RAID PQ Generate w/DIF operation performs checking/verifying DIFs for each of the RAID sources and performs P parity and Q syndrome generation on source data with DIF. The DIFs 308 are interleaved with blocks of data 302 in the RAID sources.

In an embodiment, the number of sources (blocks of data 302 with appended DIF 308) can vary between 2 and 8 as indicated by an encoded NBLKS field in the descriptor control field 702 of the descriptor 700. The operation also generates a PDIF (eXclusive OR (XOR) of all of the source DIFs) and a QDIF (an GF2 scaled XOR of all of the source DIFs) and stores them interleaved with the P parity and Q syndrome blocks. This operation is performed by treating the source interleaved data with DIF as a contiguous sequence of data and performing P and Q operations on the blocks of data 302 and the DIFs 308.

There is no checking of the generated Q syndrome block with QDIF as they are not mathematically commutative in general. As the GF2 transformation polynomial for RAID 6 (0x11D) and T10 CRC polynomial (0x18BB7) are not the same, the DIF of the Q syndrome block is not the same as the QDIF (which is the DIF corresponding to the Q of the source DIFs). However, the DIF of the P parity block is equivalent to the DIF value extracted from the PDIF because the latter is simple XOR and it can be mathematically proven to be equivalent.

Referring to FIG. 7A, the RAID P Q Generate with DIF descriptor 700 includes a descriptor control field 702, block size field 704, three source address fields 706, 712 and 714, a P parity address field 708, a Q syndrome address field 718 and a Galois Field register 716. A source DIF application tag field, source application mask field and the source reference tag seed field associated with each respective source address stored in source address fields 706, 712, 714 are included in extended descriptors (720 (FIG. 7B), 760 (FIG. 7C)) with the address of extended descriptor 720 (FIG. 7B) stored in a next descriptor address field 710. The Galois Field register 716 stores a Galois Field (GF), that is, an 8-bit constant value to be multiplied with the data block referenced by the respective source address. For example, GF1 can store an 8-bit constant value to be multiplied with the data block referenced by source address 1 in source address 1 field 706. In the embodiment shown, the 8-bit GF register 716 can store an 8-bit GF value for up to eight different sources.

Referring to FIG. 7B, the first extended descriptor 720 includes a source address field 752 and a next descriptor address field 736 to store the address of second extended descriptor 760. The first extended descriptor 720 also includes a source DIF application tag field 724, source application mask field 726 and source reference tag seed field 728 for source address stored in source address field 706, a source DIF application tag field 730, source application mask field 732 and source reference tag seed field 740 for source address stored in source address field 712, and a source DIF application tag field 740, source application mask field 742 and source reference tag seed field 744 for source address stored in source address field 714. The extended descriptor 720 includes a source DIF application tag field 746, source application mask field 748 and source reference tag seed field 750 for source address stored in source address field 752 and a source DIF application tag field 754, source application mask field 756 and source reference tag seed field 758 for source address stored in source address field 762 (FIG. 7C) in the second extended descriptor 760 (FIG. 7C).

The first extended descriptor 720 also includes field 722 which has a Source DIF Control (SDC) for each of the eight sources in the descriptor. In an embodiment, each respective SDC includes eight bits to control DIF operations, for example, the type of operation to perform (incrementing or fixed) and to enable/disable checking of application/reference tags.

Referring to FIG. 7C, the second extended descriptor 750 includes source address fields 762, 770, 780 and 790. The second extended descriptor 750 also includes source DIF application tag fields 764, 774, 782; source application mask fields 766, 776, 784; and source reference tag seed fields 768, 778, 786 for respective source addresses stored in source address fields 770, 780 and 790.

Returning to FIG. 7A, in an embodiment, the RAID engine 304 performs RAID logical operations including RAID logical operations to compute the Q syndrome and the P syndrome, that is, $$P = D_0 \oplus D_1 \oplus D_2 \ldots \oplus D_{n-1} \quad \text{(Equation 1)}$$

$$Q = g^0 * D_0 \oplus g^1 * D_1 \oplus g^2 * D_2 \ldots \oplus g^{n-1} * D_{n-1} \quad \text{(Equation 2)}$$

RAID engine 304 performs a first RAID logical operation, that is, an XOR operation on the block of data (bytes) located at Source Address 1 ($D_0$) 706 with the block of data (bytes) at Source Address 2 ($D_1$) 712 and writes the result of the XOR operation into the buffer specified by the P Parity Address field 708. Next, the RAID engine 304 performs a second RAID logical operation, that is, multiplies each byte of data in the block of data (bytes) located at Source Address 1 ($D_0$) 706 with G1 stored in the GF register 714, multiplies each byte in the block of data (bytes) at Source Address 2 ($D_1$) with G2 stored in the GF register 714, performs an XOR operation on the results of each GF multiply operation, and writes the result into the buffer specified by the Q syndrome Address field 718.

Figure 8:
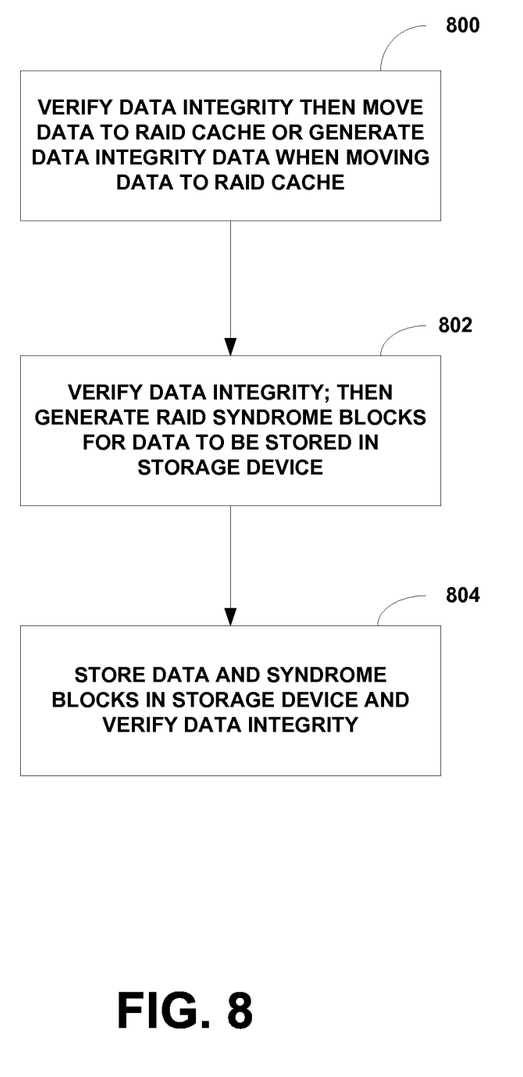
FIG. 8 is a flowgraph of a method for transferring data while performing data integrity checks via the source to destination path shown in FIG. 3.

FIG. 8 is a flowgraph of a method for transferring data while performing data integrity checks via the source to destination path shown in FIG. 3.

At block 800, the DMA controller 214 performs a DMA operation to move data to be stored in the RAID system 100 from system memory 218 to RAID cache 224. The DMA operation to be performed is defined by a DMA descriptor 400, 500, 600 stored in system memory. As discussed in conjunction with FIGS. 2-6, in addition to performing a DMA transfer of the data stored in system memory, the data integrity of the data is verified prior to storing in RAID cache based on a data integrity value stored with the data in system memory. If a data integrity value is not stored with the data in system memory the DMA operation generates a data integrity value while moving (copying) the data to RAID cache to allow the data integrity to be verified later in the path from system memory to the storage device. Processing continues with block 802.

At block 802, the DMA controller 314 performs a RAID operation to generate parity blocks for the data blocks stored in the RAID cache. The RAID operation also generates P parity (syndrome) (PDIF) and Q syndrome (QDIF) for the DIF blocks stored in the RAID cache. The RAID operation to be performed is defined by a DMA descriptor 700 stored in the system memory. As discussed in conjunction with FIGS. 2 and 7, prior to performing the DMA operation, the data integrity of each block of data is verified based on a DIF stored with the respective block of data. The DMA controller 314 also generates the T10 CRC of the P parity block and the Q syndrome block that are generated using the blocks of data stored in the RAID cache. The PDIF and QDIF are modified to store both the guard block generated for the PDIF and QDIF and the T10 CRC generated for the respective P Parity block and the Q syndrome block. The PDIF and QDIF are modified by moving the guard block stored in the guard block field to the reference tag field and storing the respective Parity block CRC in the block guard field. Processing continues with block 804.

At block 804, the modified PDIF and modified QDIF are stored in the storage device with the P and Q syndrome blocks. Storing the Parity block CRC in the DIF appended to the parity block (P and Q) allows the CRC for the parity block (P and Q) to be checked both when writing to the storage device and when reading from the storage device.

Figure 9:
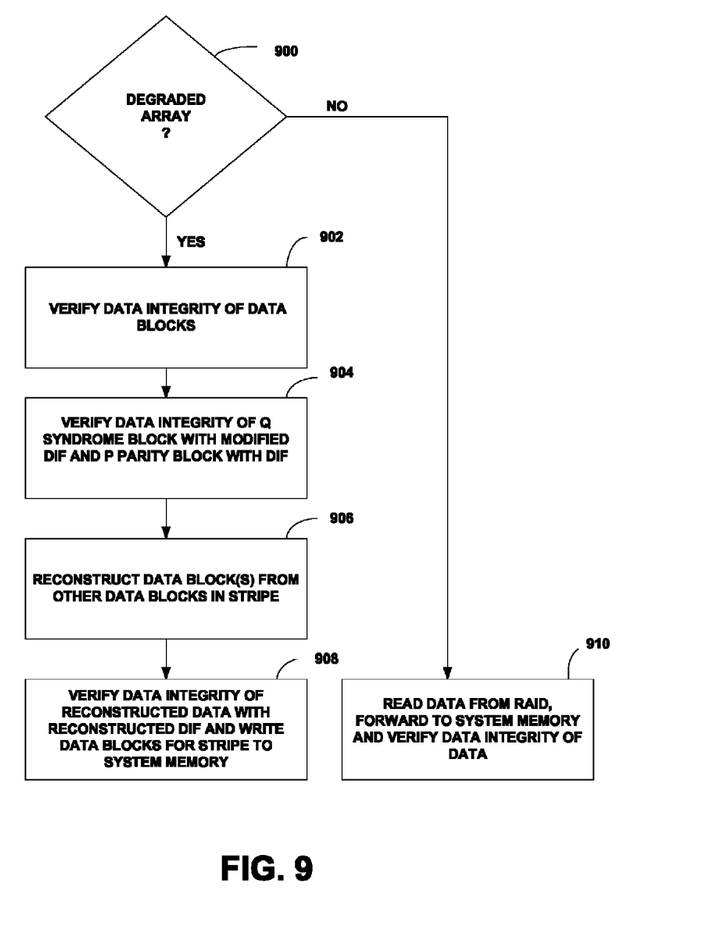
FIG. 9 is a flowgraph of a method for checking data integrity of data stored in a RAID array in the path from the RAID array to system memory.

FIG. 9 is a flowgraph of a method for checking data integrity of data stored in a RAID array in the path from the RAID array to system memory.

At block 900, the IOC 208 (FIG. 2) determines if the data is being read from a degraded array and thus requires reconstruction. If not, processing continues with block 906. If so, processing continues with block 908.

At block 902, at least one storage device in the RAID array has failed requiring reconstruction of the data stored on the storage device. The data integrity of the data blocks is checked using the DIFs stored in the RAID array for the data blocks. Processing continues with block 904.

At block 904, data integrity of the P and Q syndrome blocks is checked using the CRC stored in the modified DIF. Processing continues with block 906.

At block 906, the data is reconstructed from the other data blocks and the P and Q syndrome blocks in a stripe stored in the RAID array. Processing continues with block 908.

At block 908, the data integrity of the reconstructed data is checked with a reconstructed DIF for the reconstructed data. The reconstructed stripe is written to system memory.

At block 910 a data integrity check is performed on the data blocks read from the RAID array using the appended DIFs and the data blocks are forwarded directly to system memory.

High end Reliability, Accessibility and Serviceability is provided by migrating the parity block CRC check to an earlier point of time. An additional Parity CRC computation is performed and stored in the DIF of the syndrome blocks to provide a modified DIF. The Parity CRC stored in the modified DIF allows the parity block to be checked for CRC when it is read by an IO storage controller resulting in quicker isolation of errors. This allows a system manager to take evasive action earlier rather than wait until a storage device has failed and then determining that there is an error in the data stored in the storage device.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
generating a cyclic redundancy check (CRC) for each of a plurality of blocks of data to be stored in a stripe in a Redundant Array of Independent Disks (RAID);
prior to using the plurality of blocks of data to generate at least one syndrome block for the stripe, verifying data integrity of each of the plurality of data blocks with the generated CRC stored with each of the plurality of data blocks;
generating a second CRC for the syndrome block; and
prior to storing the plurality of data blocks and the at least one syndrome block in the RAID, verifying data integrity of each of the plurality of data blocks with the generated CRC stored with each of the plurality of data, wherein the stripe includes two syndrome blocks, a P syndrome block and a Q syndrome block, the second CRC is stored in a data integrity field with the P syndrome block and the data integrity of the P syndrome block is verified with the second CRC prior to storing in the RAID.

2. The method of claim 1, the second CRC is stored in a modified data integrity field with the Q syndrome block, the modified data integrity field allowing the data integrity of the Q syndrome block to be verified with the second CRC prior to storing in the RAID.

3. The method of claim 1, wherein the data integrity verification is performed by a Direct Memory Access (DMA) controller.

4. The method of claim 3, wherein a request to verify each of the plurality of blocks is included in a DMA descriptor that defines a RAID operation to be performed by the DMA controller on the plurality of blocks of data.

5. The method of claim 1, further comprising:
upon detecting a degraded array, verifying data integrity of the Q syndrome block with the second CRC stored in the modified data integrity field prior to reconstructing data for the stripe.

6. An apparatus comprising:
memory to store a plurality of blocks of data to be stored in a stripe in a Redundant Array of Independent Disks (RAID); and
a Direct Memory Access controller (DMAC) to generate a cyclic redundancy check (CRC) for each of a plurality of blocks of data and prior to using the plurality of blocks of data to generate at least one syndrome block for the stripe, verifying data integrity of each of the plurality of data blocks with the generated CRC stored with each of the plurality of data blocks, the DMAC to generate a second CRC for the syndrome block and prior to storing the plurality of data blocks and the at least one syndrome block in the RAID, verifying data integrity of each of the plurality of data blocks with the generated CRC stored with each of the plurality of data, the stripe includes two syndrome blocks, a P syndrome block and a Q syndrome block, the second CRC is stored in a data integrity field with the P syndrome block and the data integrity of the P syndrome block is verified with the second CRC prior to storing in the RAID.

7. The apparatus of claim 6, the second CRC is stored in a modified data integrity field with the Q syndrome block, the modified data integrity field allowing the data integrity of the Q syndrome block to be verified with the second CRC prior to storing in the RAID.

8. The apparatus of claim 7, wherein a request to verify each of the plurality of blocks is included in a DMA descriptor that defines a RAID operation to be performed by the DMAC on the plurality of blocks of data.

9. The apparatus of claim 6, wherein upon detecting a degraded array, the DMAC to verify data integrity of the Q syndrome block with the second CRC stored in the modified data integrity field prior to reconstructing data for the stripe.

10. An article including a non-transitory computer readable storage medium having associated information, wherein the information, when accessed by a processor, results in a machine performing:
  generating a cyclic redundancy check (CRC) for each of a plurality of blocks of data to be stored in a stripe in a Redundant Array of Independent Disks (RAID);
  prior to using the plurality of blocks of data to generate at least one syndrome block for the stripe, verifying data integrity of each of the plurality of data blocks with the generated CRC stored with each of the plurality of data blocks;
  generating a second CRC for the syndrome block; and
  prior to storing the plurality of data blocks and the at least one syndrome block in the RAID, verifying data integrity of each of the plurality of data blocks with the generated CRC stored with each of the plurality of data, wherein the stripe includes two syndrome blocks, a P syndrome block and a Q syndrome block, the second CRC is stored in a data integrity field with the P syndrome block and the data integrity of the P syndrome block is verified with the second CRC prior to storing in the RAID.

11. A system comprising:
  a Redundant Array of Independent Disks (RAID);
  memory to store a plurality of blocks of data to be stored in a stripe in the RAID; and
  a Direct Memory Access controller (DMAC) to generate a cyclic redundancy check (CRC) for each of a plurality of blocks of data and prior to using the plurality of blocks of data to generate at least one syndrome block for the stripe, verifying data integrity of each of the plurality of data blocks with the generated CRC stored with each of the plurality of data blocks, the DMAC to generate a second CRC for the syndrome block and prior to storing the plurality of data blocks and the at least one syndrome block in the RAID, verifying data integrity of each of the plurality of data blocks with the generated CRC stored with each of the plurality of data, the stripe includes two syndrome blocks, a P syndrome block and a Q syndrome block, the second CRC is stored in a data integrity field with the P syndrome block and the data integrity of the P syndrome block is verified with the second CRC prior to storing in the RAID.

12. The system of claim 11, wherein the second CRC us stored in a modified data integrity field with the Q syndrome block, the modified data integrity field allowing the data integrity of the Q syndrome block to be verified with the second CRC prior to storing in the RAID.

* * * * *